April 25, 1933.    C. C. H. THOMAS    1,905,975
CONCRETE BLOCK MOLDING MACHINE
Filed July 10, 1929    7 Sheets-Sheet 2

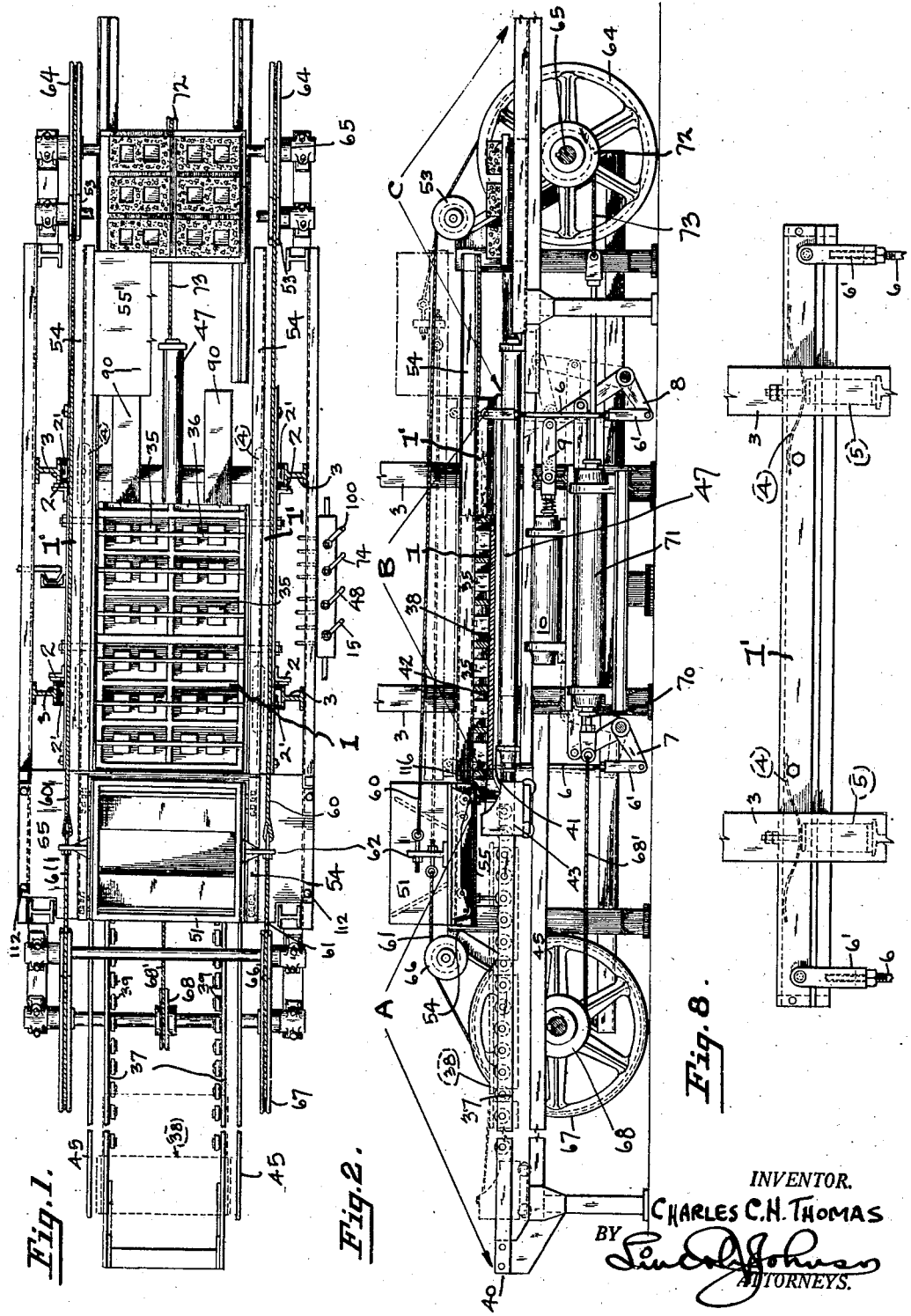

INVENTOR.
CHARLES C.H. THOMAS
BY
ATTORNEYS.

April 25, 1933.   C. C. H. THOMAS   1,905,975
CONCRETE BLOCK MOLDING MACHINE
Filed July 10, 1929   7 Sheets-Sheet 3
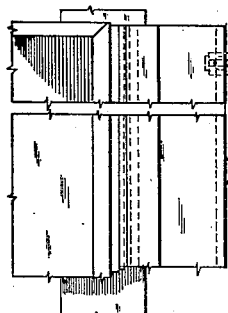
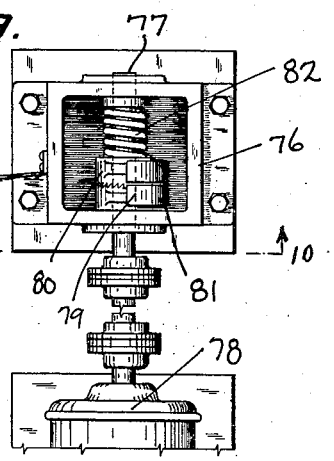
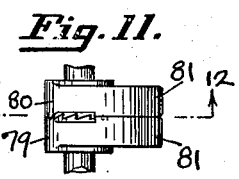
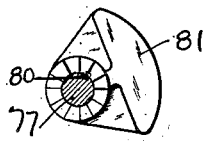
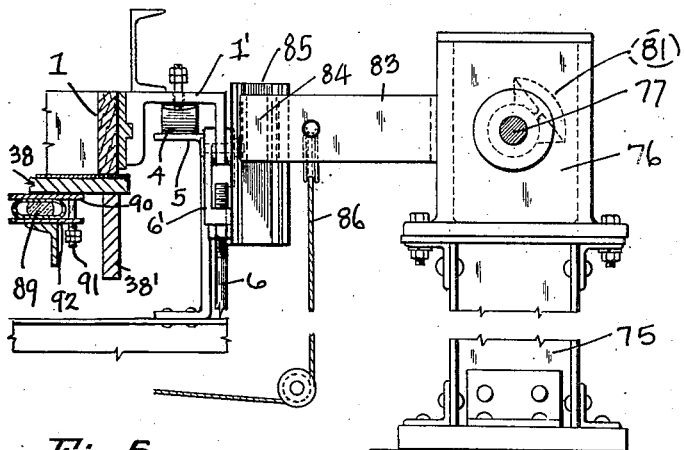
INVENTOR.
CHARLES C.H. THOMAS
BY
ATTORNEYS.

April 25, 1933.  C. C. H. THOMAS  1,905,975
CONCRETE BLOCK MOLDING MACHINE
Filed July 10, 1929   7 Sheets-Sheet 4
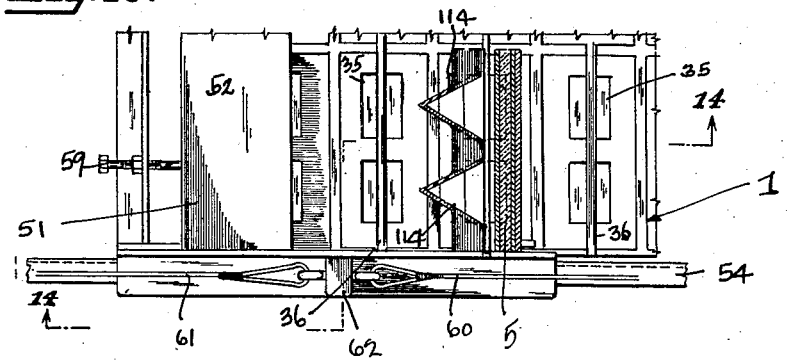
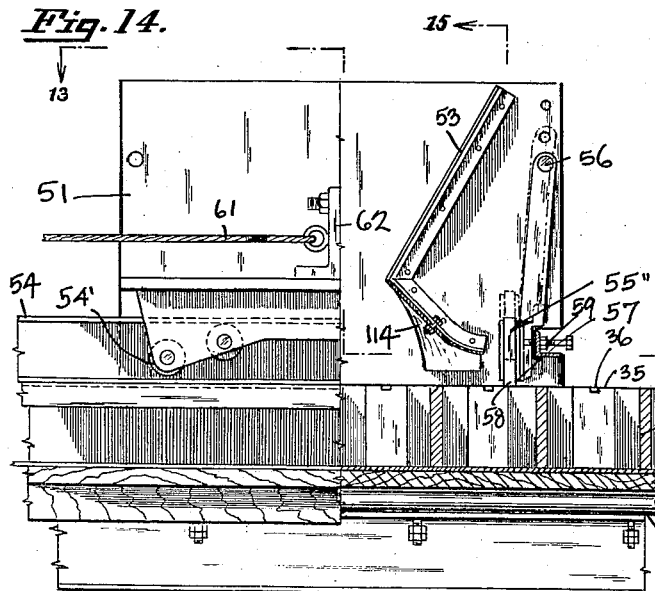
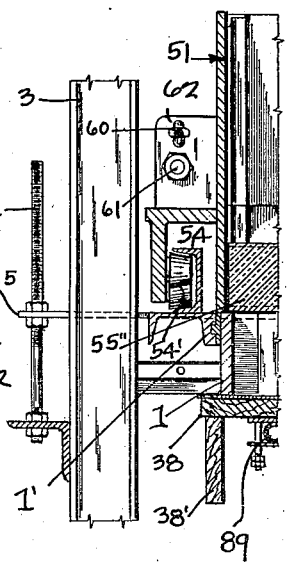
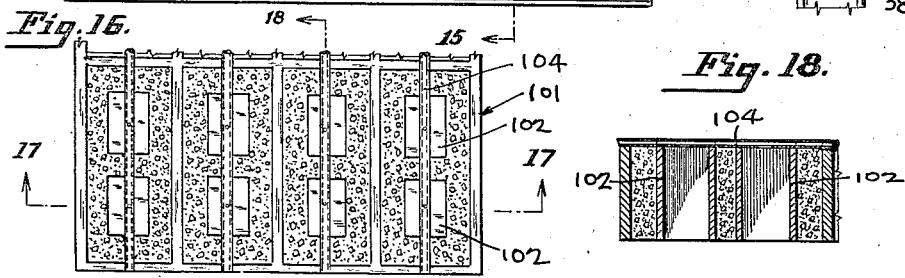
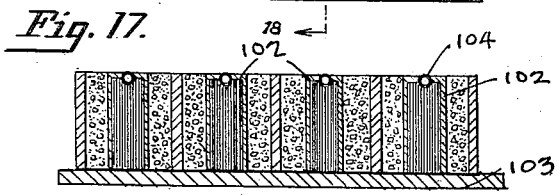
INVENTOR.
CHARLES C.H. THOMAS
BY
ATTORNEYS.

April 25, 1933.　　　C. C. H. THOMAS　　　1,905,975
CONCRETE BLOCK MOLDING MACHINE
Filed July 10, 1929　　　7 Sheets-Sheet 5
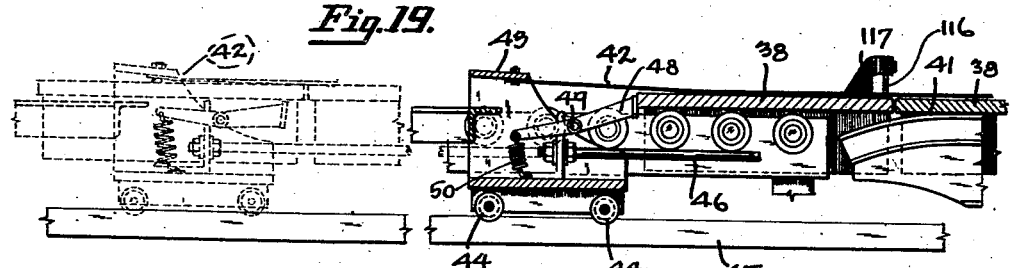
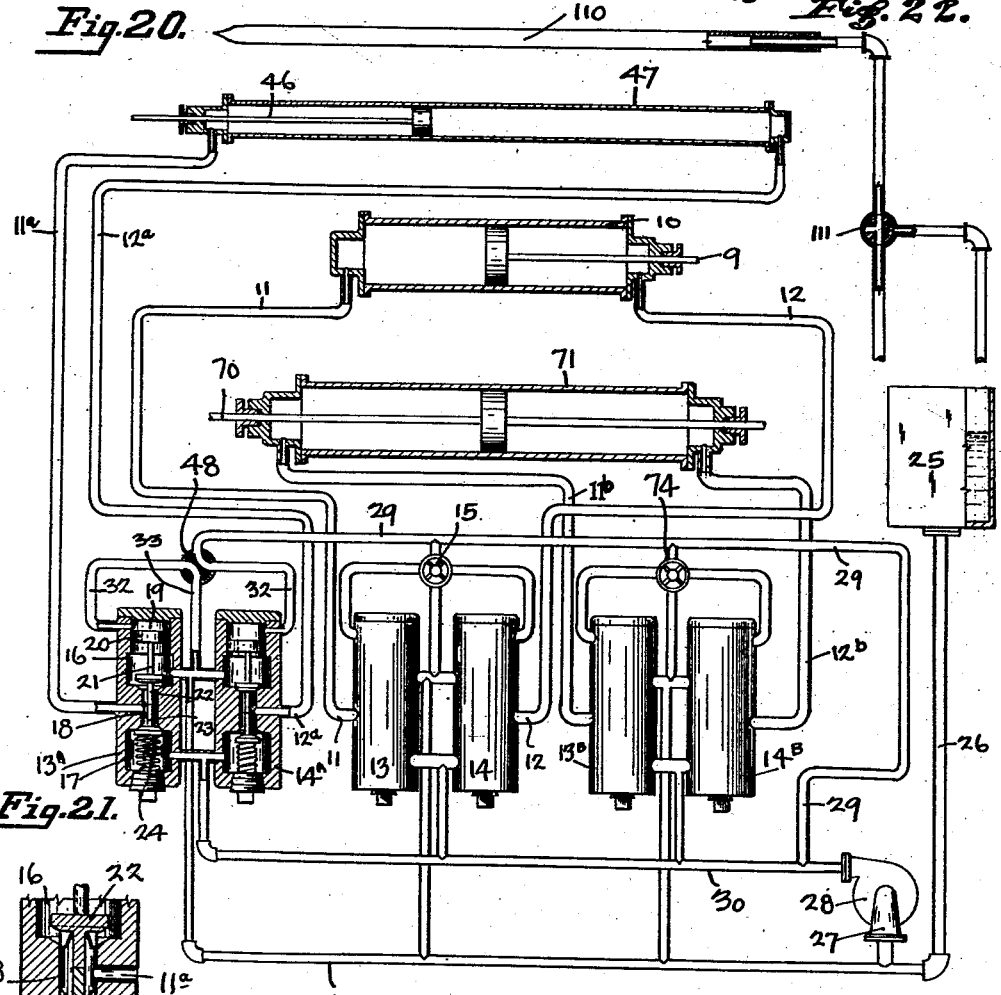

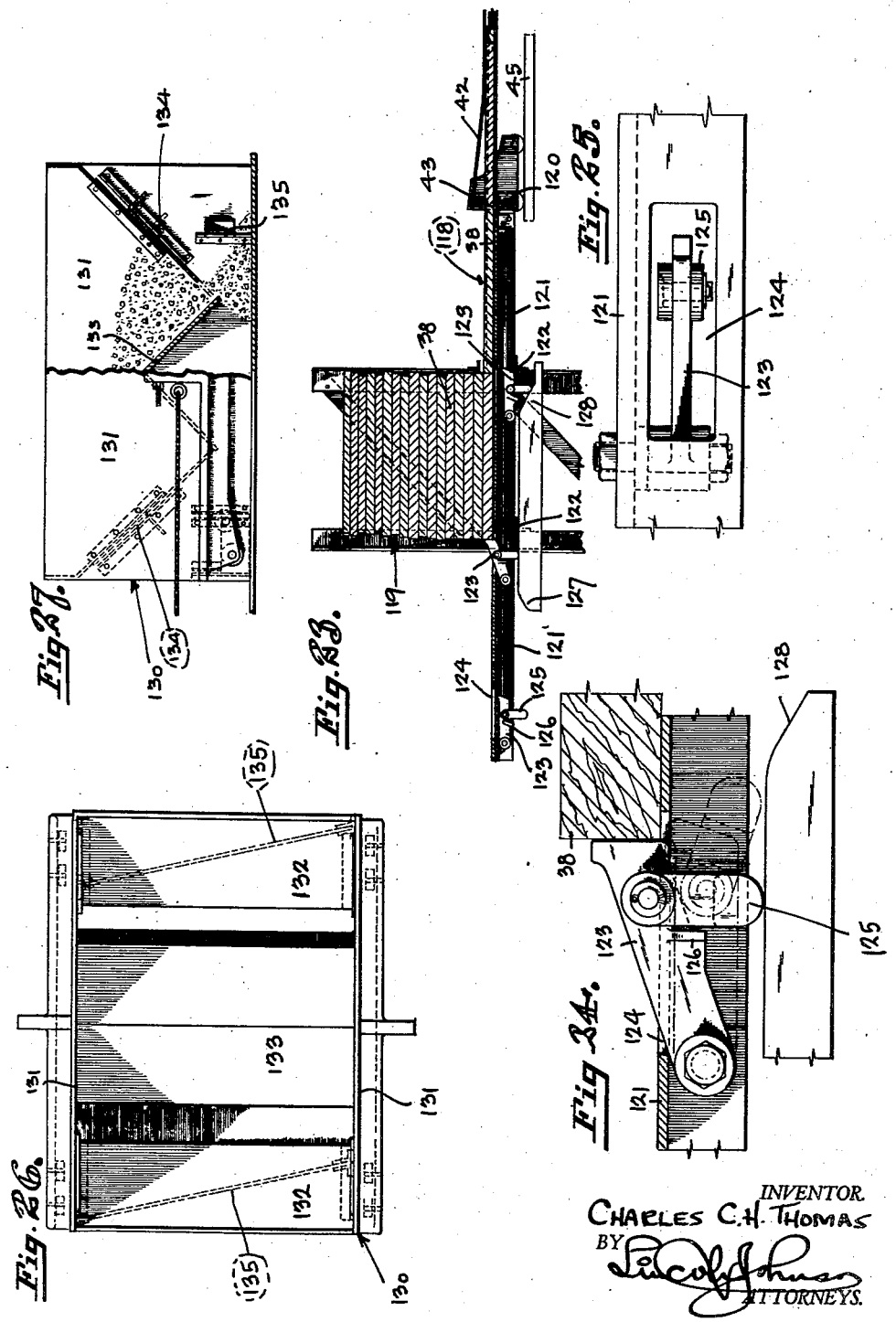

April 25, 1933.  C. C. H. THOMAS  1,905,975
CONCRETE BLOCK MOLDING MACHINE
Filed July 10, 1929  7 Sheets-Sheet 7

INVENTOR.
CHARLES C.H. THOMAS
BY
ATTORNEYS.

Patented Apr. 25, 1933

1,905,975

UNITED STATES PATENT OFFICE

CHARLES C. H. THOMAS, OF MILL VALLEY, CALIFORNIA

CONCRETE BLOCK MOLDING MACHINE

Application filed July 10, 1929. Serial No. 377,140.

This invention relates particularly to an apparatus for and method of forming plastics including such substances as concrete, clays, and the like.

An object of the invention is to provide a machine for forming concrete units wherein the said units are formed in a mold arranged over a support whereby at the completion of each molding operation, a molded unit is deposited upon the support and is removed from the machine to be suitably cured or stored, and an additional support is placed below the mold to effect continuance of the molding operation.

A further object is to provide an apparatus for and method of molding objects from plastics, which consists of placing a mold upon a supporting surface, said mold having relatively vertical side walls, and is open at its top and bottom, the hollow space of the mold being filled with plastic material and the mold vibrated to cause the said plastic material to settle or pack therein, and thereafter the said material is removed from the mold by causing relative vertical movement between the mold and molded article, to permit the molded article to be ejected from all sides of the mold evenly and simultaneously, and in a direction in line with the force of gravity.

A further object of the invention is to provide an apparatus for forming concrete units having a mold therein, open on its top and bottom sides, with the bottom of the mold closed by a pallet, a plate being interposed between the mold and pallet during the molding operation to prevent adherence between the material being molded and the pallet, whereby, upon the completion of the molding operation, said plate is removed to permit the molded product to be deposited directly on the pallet. The mold is also provided with means thereon to vibrate the concrete that is deposited in the mold to effect the compacting of said concrete, although it is to be understood mechanical tamping means might be used for densifying the concrete in conjunction with vibration.

A further object of the invention is to provide a mold for forming concrete units that is open on its top and bottom sides, the bottom of the mold being closed by lowering the mold into engagement with the support, to effect the relatively tight engagement between the support and mold bottom, during the molding operation, and thereafter to permit the molded product to remain on the pallet as the mold is moved away from the molded product.

A still further object of the invention is to provide a molding apparatus for concrete, comprised of a mold open on its top and bottom sides, the bottom side of the mold being closed by a removable pallet, and the open top of the mold being adapted to have a concrete spreader pass thereover for directing the concrete into the mold during the molding operation, and to place a predetermined quantity of concrete in the mold, which, when suitably vibrated or otherwise packed in the mold, permits the mold to be lifted away from the pallet to deposit thereon the product molded in the mold.

Other objects of the invention are to provide a machine for molding concrete units, provided with a single or multiple mold and a plurality of pallets adapted to be passed in succession below the mold, whereby during each molding operation a molded product from the single or multiple mold will be deposited upon the pallets below the mold; a resilient pressure means being utilized to move the pallets in engagement with the bottom of the single or multiple mold, during the molding operation; and mechanical vibratory means being related to the mold to vibrate the concrete mixture in the mold, during the molding operation, to the desired density.

Other objects and advantages will appear as the description advances.

Other objects and advantages are to provide an apparatus for forming plastics that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying seven sheets of drawings:

Fig. 1 represents a sectional plan view of a machine for molding concrete units constructed in accordance with my invention.

Fig. 2 is a side elevation of Fig. 1.

Fig. 6 is a cross section similar to Fig. 5, showing the mold elevated relative to the pallet, with the ejector member in position to discharge the molded product from the mold.

Fig. 8 is an enlarged side elevation of the mold.

Fig. 9 is an enlarged fragmentary plan section taken through Fig. 3 on the line 9—9.

Fig. 10 is a side elevation of Fig. 9 taken on the line 10—10 of Fig. 9.

Fig. 11 is a plan view of the separable rotor.

Fig. 12 is a cross section taken through Fig. 11 on the line 12—12.

Fig. 13 is an enlarged plan view of the hopper or spreader shown in Figs. 1 and 2, taken on line 13—13 of Fig. 14.

Fig. 14 is a cross section taken through Fig. 13, on the line 14—14.

Fig. 15 is a section taken through Fig. 14 on the line 15—15.

Fig. 16 is a plan view of a section of a modified form of mold constructed in accordance with my invention.

Fig. 17 is a cross section taken through Fig. 16, on the line 17—17.

Fig. 18 is a section taken through Fig. 17, on the line 18—18.

Fig. 19 is a cross section of the cross-head for moving the pallets on the "feed-in" section of the machine, and illustrating the latch on said cross-head in the operative and inoperative positions.

Fig. 20 is a diagrammatic lay-out of the piping and connections of the power means for actuating the machine parts.

Fig. 21 is an enlarged section taken through one of the valves in Fig. 20 on the line 21—21.

Fig. 22 is a schematic view of a pressure operated flexible tube to function as a modified form of resilient or cushioning support for the pallets during the molding operation.

Fig. 23 is a cross section thru a pallet storage rack positionable adjacent the "feed-in" section of the machine.

Fig. 24 is an enlarged side view of one of the pallet engaging latches used for removing pallets from the storage rack.

Fig. 25 is a plan view of Fig. 24.

Fig. 26 is a plan view of a modified form of hopper or spreader.

Fig. 27 is a side view of the hopper shown in Fig. 26, partly broken away to show the interior construction thereof.

Figure 3:
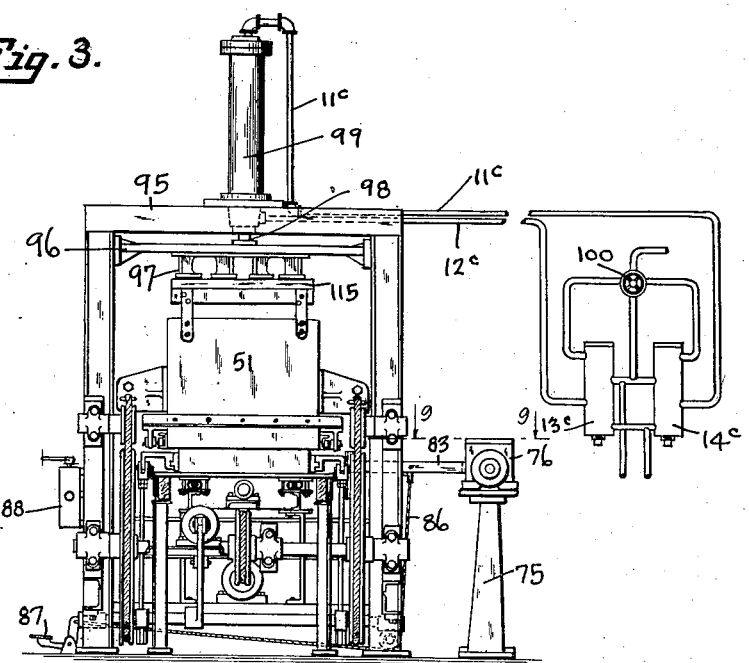
Fig. 3 is an end elevation of Fig. 2.
Figure 4:
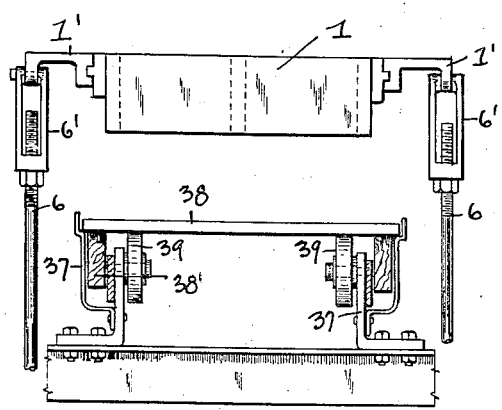
Fig. 4 is a cross section taken showing the mold in elevated position in relation to the pallet just below the mold.

In detail the construction illustrated in the drawings comprises a frame having a substantially continuous and uninterrupted pallet trackway therefor, said machine being divided into a "feed-in" section designated by the letter A; a "center" section designated by the letter B; and a "feed-out" section designated by the letter C.

The "center" section of the machine, particularly the mold parts thereof, is subjected to vibration during the operation of the machine and for this reason said "center" section is not physically connected with the "feed-in" or "feed-out" sections, although it is mechanically and operatively related to each of said sections. The machine as a whole, and each of the sections thereof, is formed of supporting legs and suitable longitudinal and transverse beams and braces, to form a rigid and sturdy structure.

The machine operation centers around the mold 1, it being the essential object of the apparatus to form plastic concrete or other moldable units in said mold and to effect the discharge of the molded product from the machine.

The mold 1 consists of a substantially rectangular frame having relatively vertical side and end walls, and is provided with transverse and longitudinal partitions to form a plurality of individual cells in the mold. The molds may be used within the scope of the invention with or without core boxes therein, for forming either solid units, known as "bricks" or hollow units known as "stone-tile", irrespective of the dimensions thereof. In the drawings I have shown each of the mold cells provided with a plurality of cores therein, said cores having the effect of minimizing the amount of material necessary to mold said units, and also gives a distinctive shape and design thereto. One or more molds, having varying arrangements of the mold cells, are mounted in the machine during the molding operation. The molds are interchangeable in the machine for molding units of different heights, widths, and lengths. The molds are mounted in a frame 1', which is provided with slide pads 2 on each of the opposite sides thereof, and said pads engage vertically disposed guides 3, to permit of upward and downward sliding movement of the mold. The pads 2 on the mold frame 1' engage the transverse faces of the guides 3 to prevent longitudinal movement of the mold frame. Springs 2' are provided either on the slide pads 2, or on the guides 3, to permit the mold frame and mold to be vibrated or shaken in a transverse or lateral direction, relative to the machine, within the limits of maximum movement possessed by the springs 2'. The guides 3, in the present instance, are stanchions or legs which go to form a part of the frame structure on which the ejectors for pushing or ejecting the molded product from the mold and the cells thereof, are operatively mounted.

The mold frame 1' is provided with resilient leaf springs 4 arranged at equidistant points at opposite sides thereof, which springs rest upon stationary brackets 5 on the machine frame to hold the mold frame at a selected level. The resistance of the springs 4 is sufficient to hold the mold at a selected level, which is approximately $\frac{1}{16}$ inch higher than the upper surface of the plate 55, upon which the hopper 51 rests in the inoperative position. At certain times during the molding operation, as will be hereinafter described, the mold is moved downwardly below said predetermined level, although against the resistance of the springs 4, to effect a relatively tight sealing engagement between the mold and the support below the mold.

The mold frame is raised and lowered vertically by means of a system of links and levers, there being a link 6 secured to each of the four corners of the mold, the lower end of said links being pivotally connected to bell cranks 7 and 8, which are in turn pivotally connected to each other and pivotally connected to a plunger 9 reciprocatingly confined in a cylinder 10 mounted below the mold in the "center" section of the machine.

The links 6 are adjustably threaded at the opposite ends thereof into clevises 6', which attach to the mold frame and operating levers, whereby the said clevises 6' may be moved to or from each other by rotating the link 6 therebetween. The operative length of the links 6 is made adjustable in order that molds 1, of different heights, may be mounted in the mold frame 1' and the machine operated thereby. Where a mold of predetermined height is used, no change of the length of the link length is necessary, but where molds of different height are substituted then it is necessary to compensate for the additional height by lengthening or shortening the links 6. The cylinder 10 is provided with a conduit 11 communicating with one end thereof and a conduit 12 communicating with the opposite end thereof. The conduit 11 connects with a valve block 13 and the other conduit 12 connects with a valve block 14. Each of the valve blocks 13 and 14 have fluid or gaseous pressure directed thereinto through a control valve 15, for regulating the directional movement of the plunger 9 in the cylinder 10 and for controlling the reciprocating movement of the mold 1. The control valve has a handle or wheel thereon for manipulative purposes.

In Fig. 20 I have indicated a diagrammatic lay-out of the cylinder 10, and also other cylinders to be hereinafter described, used in the machine operation, all of which operate on the same principle through valve blocks similar to 13 and 14 hereinbefore referred to. The interior construction of each valve block is identical and the construction of one valve block will be described in detail, and it is to be understood the construction thereof applies equally as well to the other valve blocks. Each valve block is provided with a pair of chambers 16 and 17 therein, connected by a reduced width bore 18. The upper chamber 16 is provided with a piston pocket 19 therein. A valve seat is provided at the lower end of the chamber 16 and at the upper end of the chamber 17 at both ends of the bore 18.

A piston 20 is slidably confined in the pocket 19 in the head of each valve block and said piston has a stem 21 depending therefrom. A valve 22 is slidably mounted in the bore 18 within the chamber 16 in alignment with the plunger 20 and a valve 23 is slidably mounted in the lower side of the bore 18 within the chamber 17. The inner ends of the valves 22 and 23 abut within the bore 18 and the overall length of said valves is greater than the distance between the partitions separating the chambers 16 and 17 so that at all times only one of the valves can be fully seated. An expansion spring 24 is confined in the lower chamber 17 between the bottom thereof and the under face of the valve 23 to normally force said valve upwardly to normally close said valve.

The control valve 15 is a two-way valve and by turning to a left position, will cause the plunger 9 to move in one direction, and when the valve is turned to a right position, will cause the plunger 9 to move in an opposite direction. The two-way valve 15, together with the other control valves to be hereinafter described, is connected in series with the intake and discharge sides of a source of pressure supply. Fluid or gaseous pressure is kept in a source of supply, such as a tank 25, from which it is supplied through a pipe 26 to the intake side 27 of a pump or compressor 28. The discharge side of the pump is provided with a conduit 29 that communicates with the control valve 15, and also the other similar valves, and said pump is also connected by a conduit 30, that communicates with the lower chamber 17 in each of the valve blocks. The intake side of the pump 28 is connected by a pipe 31 to the upper chambers 16 in each of the valve blocks. The valve 15 is connected by a pipe 32 to the piston pocket 19 in each valve block, and said valve 15 is also connected by a return line 33 to the intake line 31 running to the pump. The sectional view of the valve blocks shown in Fig. 20, shows a supply of fluid being forced from the pump through the line 29, thru the control valve and line 32, to the piston pocket in the valve block 14$^a$. The pressure of the fluid on the piston 20 forces the same downwardly to unseat the valve 23 in the lower chamber and to seat the valve 22 in the upper chamber. A charge of fluid is stored in each lower chamber 17 and upon opening the valve 23 passes into the bore 18 and outwardly thru the pipe 12$^a$ to the cylinder to which it is connected, to move said cylinder to the left. The fluid evacuated from the cylinder returns thru the line 11$^a$ to the bore 18 of the valve block 13$^a$ and passes upwardly thru the unseated upper valve 21 and into the return line 31 to the pump. The fluid above the piston 20 in the valve block 13$^a$ is discharged therefrom thru the pipe 32, thru the valve and line 33 and back into the intake line to the pump.

In operation, the valve for controlling the pallet actuating cylinder, is manipulated so that the pallets are started in motion slowly and gradually increase in speed until the maximum movement of the cylinder is obtained. Upon nearing the end of either directional stroke of the plunger, the speed of travel of the pallets is tapered to a stop, to eliminate any sudden bump or jar to the pallets or the molded product thereon.

Figure 28:
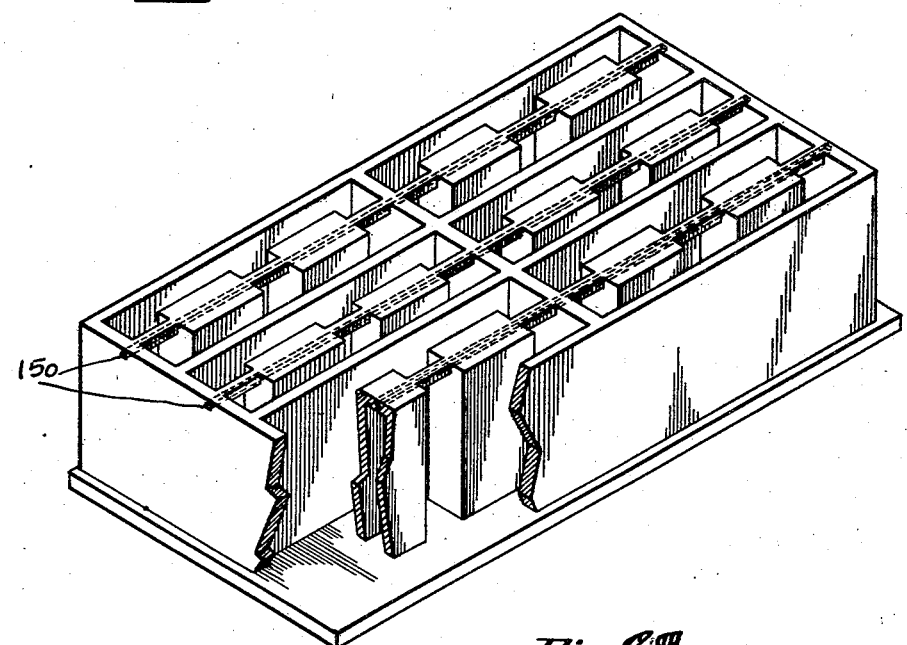
Fig. 28 is a perspective view of a plural mold provided with partitions, core boxes and core supports cast as an integral unit.

The mold 1 is shown divided by a plurality of partitions forming a plurality of mold cells, each of which is provided with cores 35 thereon. The cores in each mold are supported on a bar 36 which extends across the open upper side of the mold to suspend the cores in spaced relation within each of the mold cells. The core supporting bars 36 are arranged either longitudinally of the mold (in line with the direction of movement of the hopper or spreader 51) or transversely of the mold. The cores are used to hollow out the unit to be formed or cast and to lighten the weight thereof. Although I have shown cores in the mold, it is to be understood that the mold would function equally as well without the said cores therein. The mold 1 can be cast with the cores and core bars formed integrally therewith and said cores and core bars suitably hollowed out and vented, as shown in Fig. 28, to form a ventilated mold. A one piece mold would, preferably, be cast of a metal alloy possessing a relatively smooth surface texture and one to which the material being molded would have no affinity, whereby, said molded material could be stripped or discharged from the mold with a minimum of resistance. Whether the mold is cast as an integral unit, or not, it is preferable to arrange the length of the mold cells in line with the direction of travel of the hopper or spreader 51, as this permits the mold cells to be filled with the moldable material more efficiently, and said length of the mold cells is at right angles to the vibrator, whereby a better compacting of the material in the mold cells is effected. The mold 1 may also be demountable relative to the frame on which it is supported, for the purpose of interchanging molds of different shapes and sizes.

The open bottom of the mold in the "center" section B, is closed by a molding surface such as pallets or a separator plate, which are adapted to be advanced beneath the mold from the "feed-in" section A. A pair of parallel guides 37 are mounted on a horizontal plane on opposite sides of the "feed-in" end of the machine, to act as a conveyor for pallets 38 and to support said pallets in proper position to be advanced under the molds.

The pallets 38 consist of a flat planar surface and have the opposite ends thereof guided in the guides 37, whereby said pallets may be moved progressively thru the machine. The pallets may be provided with or without the legs 38'. The pallet legs 38' are spaced apart a distance greater than the width of the mold and are of a depth greater than the depth of the molded product. The pallet legs permit a number of pallets with the molded product thereon to be stacked in superposed relation, the molded product on the face of each pallet lying between the legs of, and below the under side of, the pallet immediately above. The pallets are thus supported, one on top of the other, by the legs thereof and no weight or pressure is applied to the molded product. Where the pallets are not provided with legs, the pallets with molded product thereon would be stacked by placing the same one on top of the other.

The pallet trackway 37 may be provided with rollers 39 thereon for assisting in the easy advance of the pallets beneath the mold. The pallet trackway 37 is supported at its outer end 40 on the standards of the machine and at its inner end said trackway is contiguous to the beginning of a trackway on the "center" section B. The trackway 41 is provided in the "center" section B to form a continuation of the pallet trackway 37. The trackways 37 and 41 register at all times whereby the pallets move in a path that is relatively on the same level in relation to the bottom of the molds. The trackway 37 is not connected with the trackway 41 because of the fact that the "center" section B of the machine, of which the trackway 41 is a part, is subjected to vibration during the molding operation, and hence the vibration is localized in the "center" section only.

Figure 5:
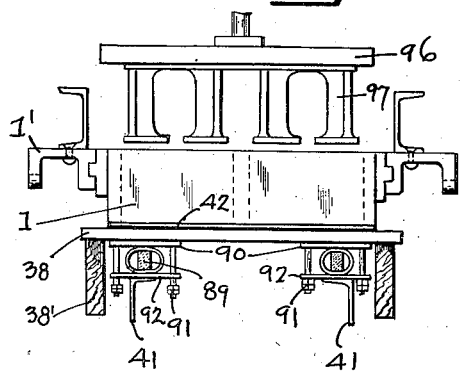
Fig. 5 is a section taken through Fig. 2 on the line 5—5, showing the mold lowered in engagement with the pallet and the ejector foot in position to engage the product in the mold.
Figure 7:
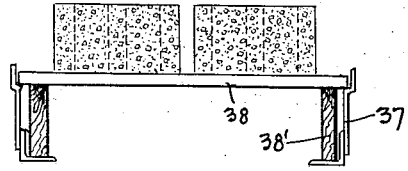
Fig. 7 is a section taken through Fig. 2 on the line 7—7, showing a pallet on the "feed-out" section machine with the molded product thereon.

The trackway 41 in the "center" section is provided with resilient runways 89 along the upper side thereof, said runways being formed of rubber or some other equivalent elastic material. The runways might also be filled with an expansive material supplied thereto from an outside source, see Fig. 22. The upper surface of the runways 89 is provided with a wear plate 90 thereon provided with studs 91 depending therefrom and slidably guided in bearings 92 provided upon the trackway 41. The pallets 38 that are supplied below the "center" section of machine have the under surface thereof resting upon the wear plate on the resilient runways. The mold 1 rests in a normal position on the pallets with the runways in the uncompressed condition shown in Fig. 5. During the molding operation the mold is forced downwardly below its normal position of rest, to effect a relatively tight sealing engagement with the face of the separator plate 42 that rests on the pallets. This downward movement of the mold against the separator plate and pallets causes a pressure to be exerted against the yielding runways 89 which will compress into the out of normal position shown in Fig. 6, and move the upper surface of the mold below the normal resting level of the hopper plate 55. The cushions 89 take up or compensate for any irregularities in the thickness of the pallets, or any foreign material that adheres to said pallets. As soon as the downward pressure of the mold on the pallets is released, the mold is restored to its normal position of rest thru the combined action of the leaf springs 4 on the mold and the resilient runways 89 below the pallets.

The sealing engagement between the pallets and mold can also be effected by holding the mold at a stationary level and raising the pallets toward the mold by means of a tube 110, Fig. 22, arranged below the pallets in place of the cushions 89. The tube 110 is expanded by fluid on gaseous pressure, supplied from the pump 28, to raise the pallets. A control valve 111 regulates the pressure flow to the tube 110.

The trackway 41 within the "center" section of the machine may be provided with means whereby the height of the said track relative to the under side of the mold can be regulated and accurately gaged to effect completion of the molding operation.

The length of the pallet trackway on the "feed-in" section is substantially equal to the overall length of the mold 1, whereby the proper number of pallets may be advanced onto said trackway to entirely cover the open bottom of the mold 1. A selected number of pallets are placed on the trackway 41 beneath the mold 1, and during the molding operation, a fresh charge of pallets are arranged on the pallet trackway in the "feed-in" section. During the molding operation, with the mold resting on the pallets, an apron or separator plate 42 is interposed between and rests against the open bottom of the mold and the upper face of the pallets. The separator plate is preferably formed of metal and has a surface to which the material being molded in the mold will not adhere. The moldable material might adhere to the face of the pallets unless said pallets are treated in one of many ways to minimize said adherence. The separator plate can be made either of sheet metal or sheet metal coated with rubber. A rubber coated plate is easily withdrawn from beneath the mold because the moisture in the concrete forms a lubricant for the rubber surface and the grit of the concrete does not hinder its withdrawal. I have found that by molding directly on top of the separator plate, which rests on the face of the pallet, it is unnecessary to treat the pallets in any special manner so that after the molding operation has been completed and the separator plate withdrawn from between the mold and pallets, it is possible to deposit the molded product directly on the pallets and to eliminate the danger of the molded product sticking to the pallets. The separator plate 42 is detachably secured at one end to a cross-head 43. It is necessary to have the apron 42 removable or detachable from the cross-head, because in molding certain types of units the separator plate is not needed, and also, pallets faced with metal might be placed directly under the molds. The cross-head is a substantially rectangular member open at its front and rear ends and is provided with rollers 44 on the bottom thereof, and on opposite sides thereof, to roll on a trackway 45 provided on opposite sides of the "feed-in" section, on a plane below the pallet trackway 37 and outside thereof. The cross-head 43 has a pallet trackway 37 passed therethru. The cross-head 43 is reciprocated back and forth on this trackway 45 by means of a plunger 46 which is secured to said cross-head 43, the plunger 46 being reciprocatingly confined in a cylinder 47 secured on a frame in the "center" section of the machine. The cylinder 47 is supplied with hydraulic power through intake pipes 11ª and 12ª connected to each of the opposite ends thereof. The flow of the hydraulic power to the opposite ends of the cylinder 47 is controlled by a two-way valve 48, provided with a handle or wheel, similar to the valve 15 previously described. The valve 48 controls the flow of hydraulic power through the valve blocks 13ª and 14ª, whereby movement of the plunger 46 either in one direction or the other in the cylinder, can be selectively controlled.

When the cross-head is in the position shown in Fig. 2 with the separator plate thereon beneath the mold 1, the operator would suitably manipulate the valve 48 to move the cross head 43 outwardly toward the front end of the "feed-in" section A, into the dotted position shown in Fig. 2. A wiper 116, formed of rubber or other resilient material, is mounted on a cross bar 117, and said wiper is adapted to wipe off the upper face of the apron on each stroke thereof. A fresh charge of pallets would be placed on the pallet trackway 37 on the "feed-in" section A, before causing the advance of the cross-head 43 outwardly. The cross-head is provided with a latch 48 pivoted at 49 to said cross-head. A tension spring 50 is connected to one end of the latch 48 and to the cross-head to normally urge the free end of the latch upwardly into the plane of travel of the pallets along the pallet trackway. As the cross-head is moved outwardly away from the "center" section toward the "feed-in" section, the latch 48 rides beneath the under side of the pallets resting on the trackway, as shown in dotted lines in Fig. 19, until the cross-head reaches the end of its stroke beyond the end of the last pallet, which permits the spring 50 to force the free end of the latch upwardly into engagement with the rear edge of the rearmost pallet, as shown in full lines in Fig. 19. As the cross-head advances outwardly over the fresh charge of pallets, the separator plate 42 is withdrawn from beneath the mold and drawn over the upper surface of the fresh charge of pallets. In order to place the fresh charge of pallets beneath the mold, the cross-head is moved in the opposite direction and the charge of pallets on the "feed-in" section, with the separator plate resting on the upper surface thereof, is advanced from the "feed-in" section toward the "center" section, moving the pallets with the molded product thereon from beneath the mold, (which has previously been raised to an elevated position sufficiently high to clear the top of the molded product resting on the pallets) from the "center" section B into the "feed-out" section C. The movement of the cross-head stops at the proper point to insure registry of the fresh charge of pallets with the bottom of the mold, when the mold is lowered into the molding position.

The method heretofore described of placing the pallets on the "feed-in" section, has been entirely manual. My invention contemplates the automatic feeding of the pallets onto the "feed-in" section, as shown in Figs. 23 to 25. Where the automatic pallet feed is utilized, a spaced parallel trackway 118 would be provided beyond the outer end of the "feed-in" section. The trackway 118 would be wide enough to support the opposite ends of the pallets. Said trackway would communicate with the pallet storage rack or basket 119 in which the pallets would be stacked or stored in superposed relation. The pallets would be placed into the basket 119 from the top thereof and removed, one by one, from the bottom thereof. The cross-head 43 would be slightly modified from the form shown in Figs. 1, 2 and 19, in that the latch element 48 would be eliminated therefrom. In lieu of the latch element 48, substitute mechanism would be provided for advancing the pallets toward the "center" section of the machine. The modified form of cross-head would have a cross bar 120 thereon, and a pair of arms 121 extending rearwardly therefrom in spaced parallel relation, and said arms would be confined in guides 122 provided on the under side of the pallet basket 119. Each of the arms 121 is provided with pairs of latch arms 123 arranged at corresponding points on each of the said arms, and at predetermined distances along the length of said arms. The distance between each pair of latches would be substantially equal to the width of one of the pallets. Each of the latches 123 are adapted to be projected upwardly thru slots 124 in the upper face of each of the arms 121. Each latch 123 is provided with a leg 125 pendulously supported therefrom and adapted to engage a stop 126 to hold said leg in a substantially vertical position, when the arms 121 are moved in one direction, and to permit said leg 125 to swing into concealed position, when the arms 121 are moved in the opposite direction. In order for the cross-head 43 to automatically place a charge of pallets on the "feed-in" section, said cross-head would be moved outwardly toward the pallet basket until the latches 123, nearest the cross-head, on the arms thereof, would lie to the rear of the rear edge of the lowermost pallet in the basket. As the cross-head would move inwardly, the leg 125 on said latch would engage the cam edge 127 arranged below the pallet basket and cause the latch to be raised upwardly through the slot in the cross-head arms 121, to engage the rear edge of the lowermost pallet and move it forwardly. As the first latch 123 continues to advance with the pallet before it, removing said pallet from the rack, the pallet immediately above in the rack, drops down to the bottom thereof, and the following latch 123 is raised into engagement with said pallet to cause the removal thereof from the storage rack. The first latch 123 in the meantime rides off of the cam 127 at its exit end 128, allowing the said latch to drop away from engagement with the pallet. The second pallet, however, then engages the rear edge of the first pallet and causes both of said pallets to be advanced simultaneously. As the second latch advances the pallet with which it is engaged from the rack, the third latch then rises and engages the third pallet which is dropped, whereby as the second latch drops from engagement with the second pallet, the third latch and third pallet causes the preceding two pallets to be advanced in line into the "feed-in" section of the machine and on onto the "center" section of the machine, to be placed in the molding position below the molds. On the return movement of the cross-head, the legs 125 on the latches, pivot or swing into idle positions when passing by the cam so as to not raise the latch 123 above the level of the cross-head arms 121. Although I have shown a particular apparatus for removing the stored pallets from the rack, it is to be understood that other means within the purview of the invention might be substituted in lieu thereof. It is also to be understood that the machine is intended to operate irrespective of whether the pallets are fed into the "center" section by hand or automatically.

When the mold is in the molding position resting upon the separator plate 42, plastic material, such as concrete or the like, is supplied to the open side of the mold from a traveling hopper or spreader 51. The spreader 51 consists of a frame open on its top and bottom sides and has the front and rear walls 52 and 53 thereof in line with the direction of movement of the spreader, arranged on an angle whereby the opening thru said end walls at the bottom of the spreader is smaller than the opening between said walls at the top of the spreader. Rollers 54' are provided on opposite sides of the bottom of the spreader to travel in a trackway 54 arranged on a plane higher than, and mounted on a line outside of the opposite top sides of the mold frame 1'. The trackway 54 is broken between the "feed-in" section A and the "center" section B, to prevent transmission of vibration from the trackway 54 on the mold frame in the "center" section, to the related trackway on the "feed-in" section. A plate 55 is provided across the trackway 54 on the "feed-in" section to form a closure for the bottom of the spreader when the said spreader is resting on said "feed-in" section in the inoperative position. The plate 55 is mounted on adjusting screws 112 to permit said plate and the track section 54 thereon to be moved vertically for registering said trackway with the trackway on the mold frame 1', when molds of different heights are mounted in the mold frame 1'. The spreader 51 will move with the trackway 54 on the plate 55 as said plate may be raised or lowered vertically. The plate 55' on the mold frame, as well as the trackway 54, is a part thereof and moves in unison with the mold frame. The spreader 51 is thus movable vertically in order to supply plastic to any and all molds of different heights that may be mounted in the mold frame. The spreader is provided with a resilient wiper 115 arranged transversely across one side thereof, to wipe off into the spreader, the concrete or plastic that may adhere to the under face of the ejector feet 97, as the spreader moves relative to the ejectors, said wiper being vertically adjustable on the spreader. The bottom edges of the front and rear ends 52 and 53 of the spreader are spaced above the upper surface of the mold to permit of the discharge of plastic material from the spreader thru the restricted bottom thereof into the open upper side of the mold, as the spreader is advanced across the mold.

A gate 55" is pivotally mounted in back of each of the front and rear walls 52 and 53 of the spreader. The gate 55" is movable on a pivot pin 56, and is adjustable for height on the spreader. The lower end 57 of the gate 55" extends transversely across the spreader and is of substantially the same width as the width of the mold 1. The gate 55" is provided with a resilient edging 58 on the lower end thereof to engage with the upper surface of the mold as the spreader is advanced across said mold. An adjusting screw 59 engages the lower end of the gate for adjusting the height of the edge thereof relative to the upper surface of the mold. As the spreader is passed in one direction across the mold, the trailing gate 55" causes the plastic concrete to be directed into the mold cells and causes excess concrete that lies on the top surface of the mold to be retained within the spreader to prevent wastage thereof. The lower edge of each gate 55" that trails has a wiping contact with the upper surface of the mold as the spreader is moved across the mold. The gates on the spreader are free to swing inwardly within a limited arc in one direction only. The purpose of this is to permit the wiping edge on the leading gate of the spreader to be moved inwardly to deposit a layer of concrete over the mold, the excess of said layer being retained or collected in the spreader by the gate on the trailing of the spreader. Each gate 55", during a phase of the spreader movement is on the trailing edge of the spreader to level or travel off the concrete on the upper face of the mold, and forces upwardly, into the spreader, whatever plastic concrete is unable to find a place in the mold cells. The interior of the spreader is also provided with pointed and adjustable plows 114 adapted to register with the upper face of the mold and core boxes, webs and walls, and to plow off, into the mold, any surplus plastic material that does not find a place in the mold cells in the passage of the spreader across the mold.

The spreader 51 is moved across the upper surface of the mold by a pair of cables 60 and 61. The cables 60 are secured to a bracket 62 on opposite sides of the spreader, said cables passing over idler pulleys 53 rotatably journaled in bearings formed on opposite sides of the end of the "feed-out" section C, and into and around sheaves 64 rotatably journaled at 65 on each of the opposite sides of the end of the "feed-out" section C. The ends of the cables 60 are securely anchored to the outside of the periphery of the sheaves 64. The distance around the circumference of the sheaves 64 is substantially equal to the length of the spreader trackway 54 to insure the movement of the spreader from one end of the mold to a position completely over the opposite end of the mold. The cables 61 are secured to the bracket 62 on the spreader 51 and pass around idler pulleys 66 and sheaves 67 respectively journaled on opposite sides of and on the end of the "feed-in" section A, of the machine. The cables 61 are anchored to the periphery of the sheaves 67 in the same manner as the cables on the sheaves at the opposite ends of the machine. The circumferences of the respective sheaves 65 and 67 are the same in order that the speed of and length of travel of the spreader box will be the same. A cable drum 68 is keyed, or otherwise, fixedly secured onto the shaft on which the sheaves 67 are mounted, and a cable 68' is reeled around said drum at one end thereof and attached at its opposite end to one end of a double acting plunger 70 reciprocatingly mounted in a cylinder 71. A cable drum 72 is fixed on the shaft on which the sheaves 64 are mounted and a cable 73, has an end thereof secured to said drum 65, and the opposite end of said cable secured to the other end of the double acting plunger 70. The double acting plunger 70 is moved back and forth within the cylinder 71 by means of hydraulic power admitted to opposite ends of the cylinder 71 through the respective pipes 11$^b$ and 12$^b$ by a two-way control valve 74. The two-way control valve 74 and the respective conduits 11$^b$ and 12$^b$ are connected in series with a pair of valve blocks 13$^b$ and 14$^b$, similar to those previously described. By suitable manipulation of the control valve 74, hydraulic power may be selectively directed to opposite sides of the piston on the plunger 70 within the cylinder 71, and said plunger moved in a predetermined direction to impart rotative action to the connected sheaves and cables to move the spreader box 51 back and forth across the open side of the mold, to supply plastic concrete thereto.

A modified form of hopper or spreader is shown in Figs. 26 and 27. This hopper is similar to the spreader box 51, and is intended to perform precisely the same function even though the specific construction of the modified form of the spreader box is different from the spreader box 51. The modified form of spreader box 130 consists of a pair of side walls 131, each of which are provided with suitable rollers or wheels, on the bottom edges of opposite sides thereof. Opposite ends of the spreader box are connected together by inwardly slanted end members 132, said end members extending downwardly to a point on the side members substantially midway between the top and bottom thereof. A transverse division member 133, inclined downwardly toward the front and rear ends of the spreader box, is arranged therein substantially equidistant between the slanted end walls 132. The transverse member 133 is raised a substantial distance above the bottom edge of the spreader box. The slanted faces of the transverse member 133 in relation to the slanted end walls 132, divides the spreader box 130 into a pair of compartments. The space between each of the slanted faces of the transverse member 133 and the bottom edges of the slanted end members 132 is closed by a slide gate 134 slidably confined below the under side of each of the end members 132. Each gate 134 is adjustable relative to the face of the transverse member 133, to regulate and control the volume and amount of plastic material to be discharged from each of the respective compartments in the spreader box. A wiper or trowel 135 is provided, preferably across each of the opposite ends of the spreader box 130, below the slanted end walls thereof, to level off to a desired depth, the amount of plastic material to be deposited onto any surface over which the spreader box passes. The trowels 135 are arranged on an inclined angle across the spreader box ends to effect a more efficient troweling or leveling operation.

The plastic material which is placed in the hoppers or spreaders to be charged into the molds for forming the unit to be molded, is preferably concrete, although it is to be understood that any type of moldable material can be used within the scope of the invention. The moldable aggregate might be either concrete, clay, cinders or combinations of clay and cinders, concrete and cinders, or any and all types of moldable substances.

An important feature of the present invention is the use of a properly proportioned mixture of cement, sand and rock, and the proper amount of water to give the greatest strength and capalarity, a satisfactory mixture being one part cement, two and one-half parts sand or its equivalent, and two and one-half parts crushed rock or gravel. These are placed in a mixer, (not shown) in a dry condition and the water is then added. The amount of water, after once being determined, should be measured in each batch the same as the other materials; the right amount of water being that which will give the mix a mushy consistency. The mix should not be soupy and, on the other hand, it should not be so stiff to require ramming into the partitions of the mold as this would result in a porous or cellular texture when the blocks set and harden.

The proportion of cement, sand and rock, together with the amount of water employed, is important as a fairly slight variation in any one will interfere with the stripping operation and will often cause the walls of the blocks to slough in and crumble after the molds are lifted or removed. The amount of crushed rock employed is in reality sufficient to fill the molds, and the amount of sand and cement employed is just sufficient to fill the interstices between the rock and bind the mass together. When this proportion is maintained it is found that the thin walls of the blocks stand up and that any tendency to cave in or run is prevented, providing the molds are lifted and in the manner heretofore set forth. However, if the proportions of material are varied to any extent, considerable difficulty is encountered both during the stripping operation and thereafter as the flat wet walls of the blocks are liable to collapse, slide, run, etc.

During the period that the spreader 51 is being advanced back and forth across the open upper side of the mold, the mold is subjected to intensive vibration on a horizontal plane, to vibrate and densify the plastic material that is being supplied to the mold. The vibrating apparatus consists of a pedestal 75, mounted upon a base independent of the frame of the machine, and has a housing 76 mounted on the upper end thereof. A shaft 77 is journaled in the housing and extends out beyond one end thereof into flexible connection with a motor 78, or some other prime mover. Within the housing 76 a rotor for producing vibration is mounted on the shaft 77. The rotor consists of a pair of complementary parts 79 and 80, each of which have the matching faces thereof serrated or notched. Each of the rotor parts are provided with weights 81 disposed on the periphery thereof. The rotor part 79 is keyed or otherwise fixedly secured to the shaft 77, and the rotor part 80 is movable on the shaft 77, whereby said movable rotor part may be placed in any desired position of engagement with the immovable rotor part. A compression spring 82 is coiled around the shaft 77 between the movable part 80 and the housing 76 to hold the movable rotor part in engagement with the immovable rotor part. By placing the rotor parts in engagement with the weights on each of said parts diametrically opposite, or 180° apart, the shaft 77 will be equally balanced. Any position of the weights on the rotor other than when the said weights are diametrically opposite, will cause an unbalanced condition of the shaft and set up a vibration as the shaft is rotated. The construction of the separable rotor parts hereinbefore described, permits any selected degree of balance or unbalance of the vibrator shaft to be obtained. The vibrator casing 76 is provided with a resilient arm 83 thereon extending outwardly therefrom into position whereby the end 84 of said arm can engage an elongated socket 85 arranged in a vertical plane on the side of the mold 1.

The arm 83 is normally positioned so as to not engage the socket 85, due to its inherent resiliency. A cable 86 is attached to the arm 83 which connects to a foot pedal 87 located on the side of the machine adjacent the control box 88 in which the respective two-way control valves 15, 48 and 74 are mounted. The vibrator is running constantly so that by engaging the arm 83 with the socket 85 on the mold, vibration can be immediately transferred to the mold for as long a period as may be desired. The elongated socket 85 permits the mold to be vibrated even when in a raised position relative to the face of the pallets, whereby the vibration may be utilized for the purpose of causing the discharge of the molded product from the mold, if desired.

The upright stanchions 3 of the "center" section of the machine frame extend above the level of the path of travel of the hopper 51 and are connected across the top by a beam 95. A frame 96 is mounted to slide vertically on the stanchions 3 and on its opposite side is provided with ejectors 97 which are of the contour of the open spaces in the mold cells, whereby when the mold is being moved into the raised position shown in Fig. 6, the ejector frame is moved downwardly to force the ejectors 97 into registry with the open space of the mold and into engagement with the exposed surface of the molded product therein to hold the molded product on the pallet and to cause its discharge from the mold by the movement of the said mold relative to the molded product. During the raising of the mold relative to the molded product, the mold frame could be vibrated to assist in freeing the molded product from the mold, whereby the said molded article is ejected from all sides of the mold evenly and simultaneously, and in a direction in line with the force of gravity.

The ejector frame 96 is reciprocated vertically by a plunger 98 confined in a cylinder 99 which is supplied with hydraulic power to opposite ends thereof by conduits 11ᶜ and 12ᶜ. A two-way control valve 100, mounted on the control board 88, or contiguous thereto, controls the flow of hydraulic power to a pair of valve blocks 13ᶜ and 14ᶜ, similar to those previously described.

The movement of the ejector may be controlled manually or it may be made to operate automatically in unison with the mold movement. Assuming the ejectors to be "down" in the ejecting position, the mold frame 1' may be elevated a selected distance to contact with the handle on the ejector valve 100, to thereby cause the ejectors to raise simultaneously with the mold. The ejectors would remain in the raised position until the operator would shift the control valve 100, to again lower the ejectors. No manual operation, therefore, is required to raise the ejectors.

The operation of filling the mold with plastic concrete, may, in accordance with the teachings of the present invention, be accomplished in the manner as hereinafter set forth, to wit, that of passing the spreader 51 over and back across the open upper side of the mold to discharge a predetermined amount of plastic material into the mold, to vibrate the plastic in the mold; and to remove the excess plastic by the gates on the spreader box.

Another method of practicing the molding process consists in moving the spreader 51 once across the mold from the plate 55 to a plate 55' at the opposite end of the machine to deposit an initial charge of plastic concrete into the mold and to vibrate the plastic material in the mold. After this initial charge of plastic material has been introduced into the mold, the ejector 97 is lowered to pack or tamp or compress said initial charge of concrete, and the spreader box 51 is then returned back to the plate 55 across the upper side of the mold to supply the balance of the necessary plastic material to the mold, to fill the same with concrete flush with the top of the mold. The initial deposit of material by the spreader should be sufficient to fill the molds to any selected level when pressed thereinto by the tamping ejector feet. The method of tamping the partially filled mold by the ejector feet, has the effect of hastening the packing or densifying of the concrete in the mold and materially decreases the time involved in completing a molding operation.

In Figs. 16, 17 and 18, I have shown a modified form of plural cell mold 101, in which the cores 102 are hollow and open on the bottom side thereof next the pallet 103 on which the said mold rests. The cores 102 are supported in the molds by hollow cross bars 104, which, at the point of connection with the cores, are drilled to provide communication between the interior of said support bars and the interior of the cores. A mold of this character permits normal atmospheric air or air under pressure to be admitted into the interior of the molded product and is of material assistance in effecting the discharge of the molded product from the mold by eliminating any suction or sticking between the molded product and the mold.

In Fig. 28, I have shown a perspective view of a mold having a plurality of mold cells therein and provided with cores in the mold cells. In the mold shown in Fig. 28, the mold frame, partitions, core boxes and core-box supporting bars, are cast as an integral unit. The core box and core box supporting bars are provided with vent holes 150, to vent the core spaces formed in the mold unit and to break any suction or vacuum that might be created between the bottoms of the core box and mold, as the same is being withdrawn from the molded product.

One of the essential features of my invention is to effect the separation of the molded product from the mold evenly and uniformly, and in line with the force of gravity. Where a solid faced pallet is used to cover the bottom of the multi-cell mold it ofttimes happens that a suction or pulling effect is obtained between the mold bottom and the bottom of the core box therein and the upper face of the pallet, due to the more or less hermetically sealed effect resulting from the filling of the mold with the plastic material. Any tendency of the molded product to stick in the mold or of the mold to stick to the pallet is negatived by ventilating the area at the bottom of the mold. The same ventilating effect can be accomplished by providing a pallet that has a plurality of apertures or openings cut therethrough. The dimensions of the pallet would be such that a plurality of different sizes of units could be molded thereon and the cored spaces in each of the various sizes of units would register with the apertures or openings through the pallet.

Figure 29:
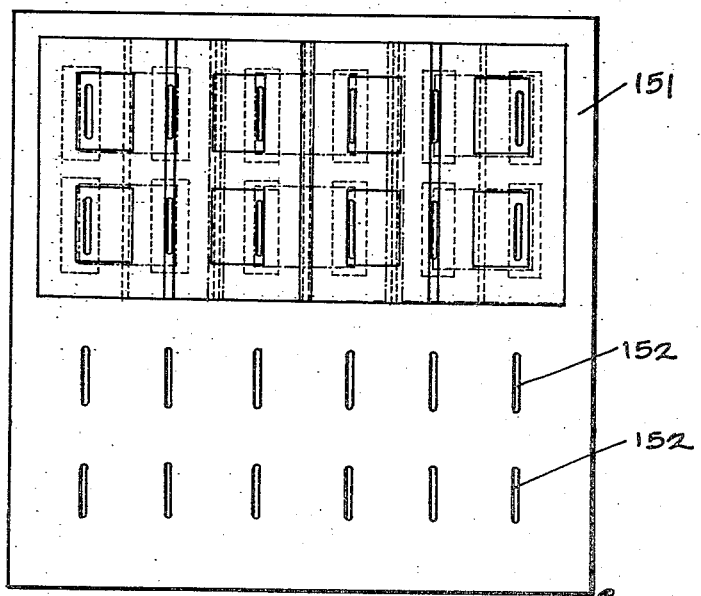
Fig. 29 is a plan view of a pallet provided with vent holes therethrough and having a plurality of different sizes of units indicated on the pallet in registry with the pallet vent holes.

In Fig. 29, I have shown a ventilated pallet 151 having a plurality of openings 152 therethrough. A relatively large size of unit to be molded is indicated in full lines, on the pallet with the core opening of said unit registering with openings through the pallet. A smaller size unit is also indicated by dot and dash lines, and it also has the cored openings therein registering with the openings through the pallet. A still smaller sized unit is also indicated by dotted lines, with the core openings therein in registry with the core openings through the pallet. A pallet of predetermined dimensions can be provided with ventilated openings therethru, laid out in a predetermined relation with respect to a plurality of different sizes of units to be formed on said pallet. The suction effect between the bottom of the mold and the molded product therein, and the pallet, can also be broken by the withdrawal of the apron or separator plate 42, from between the aforementioned parts.

The operating cycle of the molding operation is as follows:

The fluid pressure pump 28 and vibrator are connected up and are running; the hopper 5 is on its left hand resting plate 55, and the pallet cross-head 43 and apron 42 are in the "center" position underneath the molds, with the apron resting on three pallets, and additional pallets in readiness to be fed into the machine; the mold frame 7 is resting of its own weight on the apron 42, in which position it should be approximately one-sixteenth inch higher than the adjoining hopper 51 resting plate 55 on the left hand end of machine. (This one-sixteenth inch can be obtained by adjusting the four leaf springs 4 located, one each, at corners of the under side of the mold lifting beams, in conjunction with cushioning device 89 beneath the pallets in the center of the machine); the ejectors 97 are in the "up" position with the ejectors corresponding to the mold in use attached; the pilot valves 15, 48, 74 and 100 are in their neutral position, excepting the valve 100 which controls the ejectors in which the handle is turned to hold said ejectors up; and the vibrator is vibrating the mold.

With the machine parts in the position as outlined in the preceding paragraph, the hopper or spreader 51 is filled with the proper plastic mix and is drawn forth and back over the molds, the molds 1 being held down tightly upon the apron 42 by means of the valve 15 being thrown to the "down" side, causing pressure to compress the cushions 89 beneath the pallets and eliminating the one-sixteenth inch difference in elevation that was previously referred to, thus permitting free travel of the hopper or spreader 51 over the molds, the molds being vigorously vibrated while being filled.

When the molds are filled, the hopper is drawn to the resting plate 55 and the vibrator connection to the machine released. The valve 15 of the mold lift cylinder is now thrown to the left hand side, which causes the withdrawal of the apron 42 from beneath the mold, outwardly over the next three pallets previously fed in. The first action of valve 15 releases the fluid pressure and permits the springs 4 of the mold table to lift the same sufficiently for the withdrawal of the apron and simultaneously, with the preceding action, the ejector valve 100 is thrown to the "down" position, which causes the ejectors to lower rapidly.

The mold table is next lifted by throwing the valve 15 to the "up" position and the ejectors press against and discharge the product from the mold to the pallets beneath. The ejectors are next lifted, and simultaneously, the pallet cross-head control valve 48 is placed in the neutral position at the end of each stroke.

The molding operation is repeated, whereby in the mold is next lowered tightly against the apron with full pressure being maintained until such time as the molds are again filled.

In filling the molds for units, the proportions of which are higher than the width, to speed up the action, the hopper is so arranged that it spreads a thick mat of concrete over the molds, doing this in a directional movement one way across the machine, followed by a quick lowering and raising of the ejector feet to force the excess concrete into the molds, the same being vibrated simultaneously, and then the return passage of the spreader to complete the filling, the ejectors again being lowered to complete the cycle as heretofore explained.

The ejectors 97 are not always needed to eject units from the mold, but, for units of a greater height than width, ejectors may be required. Units of a height less width, can be discharged from the mold by vibrating the mold during the time it is being lifted, thus requiring no help from the ejectors to assist in ejecting.

In the molding operation heretofore described, the mold is completely filled with plastic concrete up to a level flush with the top thereof. I do not wish to be limited solely to this method of molding, but, contemplate that the invention shall cover a molding apparatus wherein the molds are filled with concrete up to a level flush with the under side of the bars 36 that hold the cores 35 in the molds. To do this an initial charge of concrete is supplied the mold which is vibrated in the mold and is also forced into the molds by a quick action of the ejectors before the excess concrete on the mold top is cut off. The ejectors are next raised and the surplus concrete trowelled off. As a final step the ejectors are again lowered into contact with the concrete in the mold to settle the concrete in the mold even with the bottom side of the core supporting bars 36. This particular sequence of steps gives a uniform density to the material in the mold and also eliminates any core or mold indentation or impression in the molded unit.

Having thus described this invention, what I claim and desire to secure by Letters Patent is:

1. In combination, a mold, open on its top and bottom sides; a pallet arranged to engage the bottom side of the mold at a predetermined level; resilient means to support the pallet relative to the mold at said predetermined level; and means to move the engaged mold and pallet away from said predetermined level in opposition to the resilient pallet support to effect a closer engagement between the mold and pallet than when at the predetermined level.

2. In combination, a mold, open on its top and bottom sides; means to supply the material to be molded thru the top side of the mold; a pallet to close the mold bottom at a predetermined level; a plate positionable between the mold bottom and pallet when the material is being molded; resilient means to support the pallet and plate relative to the mold at said predetermined level; and means to move the engaged mold plate and pallet away from said predetermined level, in opposition to the resilient pallet support, to effect a closer engagement between the mold plate and pallet during the molding operation than when at the predetermined level.

3. In combination, a mold, open on its top and bottom sides; a pallet arranged to engage the bottom side of the mold at a predetermined level; resilient means to support the pallet relative to the mold at said predetermined level; means to move the engaged mold and pallet away from said predetermined level in opposition to the resilient pallet support to effect a closer engagement between the mold and pallet than when at the predetermined level; and means on the mold to restore the mold to said predetermined level.

4. In combination, a mold, open on its top and bottom sides; means to supply the material to be molded thru the top side of the mold, a pallet to close the mold bottom at a predetermined level; a plate positionable between the mold bottom and pallet when the material is being molded; resilient means to support the pallet and plate relative to the mold at said predetermined level; means to move the engaged mold plate and pallet away from said predetermined level, in opposition to the resilient pallet support, to effect a closer engagement between the mold plate and pallet during the molding operation than when at the predetermined level; and means on the mold to restore the mold to said predetermined level after completion of the molding operation.

5. In combination, a mold, open on its top and bottom sides; a pallet arranged to engage the bottom side of the mold at a predetermined level; resilient means to support the pallet relative to the mold at said predetermined level and means to move the mold into engagement with the pallet and to move the pallet downwardly in opposition to its resilient support to place the mold and pallet below the predetermined level thereof to effect closer engagement between the mold and pallet than when at the predetermined level.

6. In combination, a mold, open on its top and bottom sides; means to supply the material to be molded thru the top side of the mold; a pallet to close the mold bottom at a predetermined level; a plate positionable between the mold bottom and pallet when the material is being molded; resilient means to support the pallet and plate relative to the mold at said predetermined level; and means to move the mold into engagement with the plate and pallet and to move the pallet downwardly in opposition to its resilient support to place the mold, plate and pallet below the predetermined level thereof to effect closer engagement between the mold, plate and pallet during the molding operation than when at the predetermined level.

7. In combination, a mold, open on its top and bottom sides; a pallet arranged to engage the bottom side of the mold at a predetermined level; resilient means to support the pallet relative to the mold at said predetermined level; means to move the mold into engagement with the plate and pallet and to move the pallet downwardly in opposition to its resilient support to place the mold, plate and pallet below the predetermined level thereof to effect closer engagement between the mold, plate and pallet during the molding operation than when at the predetermined level; and means on the mold to restore said mold to said predetermined level.

8. In combination, a mold, open on its top and bottom sides; means to supply the material to be molded thru the top side of the mold; a pallet to close the mold bottom at a predetermined level; a plate positionable between the mold bottom and pallet when the material is being molded; resilient means to support the pallet and plate relative to the mold at said predetermined level; means to move the mold into engagement with the plate and pallet and to move the pallet downwardly in opposition to its resilient support to place the mold, plate, and pallet below the predetermined level thereof to effect closer engagement between the mold, plate and pallet during the molding operation than when at the predetermined level; and means on the mold to restore the mold to said predetermined level after completion of the molding operation.

9. A machine for molding plastic substances, comprised of a mold to receive plastic substances; a constant running vibrator independent of the mold; and means to establish selective connection between the vibrator and mold to vibrate the plastic substances in the mold.

10. A machine for molding plastic substances, comprised of a mold to receive plastic substances; a constant running vibrator independent of the mold; means on the vibrator to regulate and control the intensity of vibration; and means to establish selective connection between the vibrator and mold to vibrate the plastic substances in the mold.

11. A machine for molding plastic substances, comprised of a mold to receive plastic substances; a constant running vibrator independent of the mold; an arm on the vibrator; a socket on the mold to receive said arm; and means to connect the arm and socket to vibrate the plastic substances in the mold.

12. A machine for molding plastic substances, comprised of a mold to receive plastic substances; a constant running vibrator independent of the mold; a resilient arm on the vibrator arranged in a position free of engagement with the mold; and means to move said resilient arm into engagement with the mold to transmit vibrations from the vibrator to the mold to vibrate the plastic substances in the mold.

13. In a molding machine, a mold to receive plastic substances; a support beneath the mold to receive the molded article from the mold; means to raise the mold relative to the support; a constant running vibrator independent of the mold; and means to establish connection between the vibrator and mold to vibrate the substances in the mold when the mold is on the support and when the mold is moved relative to the support.

14. In a molding machine, a mold to receive plastic substances; a support beneath the mold to receive the molded article from the mold; means to raise the mold relative to the support; a constant running vibrator independent of the mold; and means to establish connection between the vibrator and mold to vibrate the substances in the mold when the mold is on the support and when the mold is moved relative to the support, consisting of an elongated socket on the mold and an arm on the vibrator, said arm being movable in the socket on the mold.

15. A machine for molding concrete units comprising, a mold open on its top and bottom sides; a pallet trackway beneath said mold divided into separate "feed-in", "center", and "feed-out" sections; a plurality of pallets arranged on each of said sections; a cross head movable in the forward line of travel of the pallets along the trackway, to engage the pallets on the "feed-in" section to move said pallets progressively forward toward the "center" and "feed-out" sections; and an apron on said cross head resting on the pallets that are moved from the "feed-in" to the "center" sections to be interposed between the pallets and mold in the "center" section, said apron being withdrawn by the cross head from between the pallets and mold in the "center" section as it is moved rearwardly to rest on a fresh charge of pallets on the "feed-in" section.

16. A machine for molding concrete units comprising, a mold open on its top and bottom sides; a pallet trackway beneath said mold divided into separate "feed-in", "center", and "feed-out" sections; a plurality of pallets arranged on each of said sections; a cross-head movable in the forward line of travel of the pallets along the trackway; a latch pivoted to said cross-head to engage the rearmost pallet on the "feed-in" section at the time of commencing the forward progressive movement of the pallets toward the "center" and "feed-out" sections, said latch passing beneath a fresh charge of pallets on the "feed-in" section as it moves rearwardly to engage said fresh charge of pallets; and an apron on said cross-head resting on the pallets that are moved from the "feed-in" to the "center" sections to be interposed between the pallets and mold in the "center" section, said apron being withdrawn by the cross-head from between the pallets and mold in the "center" section as it is moved rearwardly to rest on a fresh charge of pallets on the "feed-in" section.

17. A machine for molding concrete units comprising, a mold open on its top and bottom sides; a pallet trackway beneath said mold divided into separate "feed-in", "center", and "feed-out" sections; a plurality of pallets arranged on each of said sections; a cross-head movable in the forward line of travel of the pallets along the trackway, to engage the pallets on the "feed-in" section to move said pallets progressively forward toward the "center" and "feed-out" sections; an apron on said cross-head resting on the pallets that are moved from the "feed-in" to the "center" sections to be interposed between the pallets and mold in the "center" section, said apron being withdrawn by the cross-head from between the pallets and mold in the "center" section as it is moved rearwardly to rest on a fresh charge of pallets on the "feed-in" section; means to engage the mold in sealed contact with the apron and the pallets in the "center" section; and means to release the engagement of the mold on the apron to permit said apron to be withdrawn and the molded products deposited on the pallets in the "center" section preliminarily to moving said pallets onto the "feed-out" section.

18. A machine for molding concrete units comprising, a mold open on its top and bottom sides; a pallet trackway beneath said mold divided into separate "feed-in", "center", and "feed-out" sections; a plurality of pallets arranged on each of said sections; a cross-head movable in the forward line of travel of the pallets along the trackway; a latch pivoted to said cross-head to engage the rearmost pallet on the "feed-in" section at the time of commencing the forward progressive movement of the pallets toward the "center" and "feed-out" sections, said latch passing beneath a fresh charge of pallets on the "feed-in" section as it moves rearwardly to engage said fresh charge of pallets; an apron on said cross-head resting on the pallets that are moved from the "feed-in" to the "center" sections to be interposed between the pallets and mold in the "center" section, said apron being withdrawn by the cross-head from between the pallets and mold in the "center" section as it is moved rearwardly to rest on a fresh charge of pallets on the "feed-in" section; means to engage the mold in sealed contact with the apron and the pallets in the "center" section; and means to release the engagement of the mold on the apron to permit said apron to be withdrawn and the molded products deposited on the pallets in the "center" section preliminarily to moving said pallets onto the "feed-out" section.

19. A machine for molding concrete units comprising, a mold open on its top and bottom sides; a pallet trackway beneath said mold divided into separate "feed-in", "center", and "feed-out" sections; a plurality of pallets arranged on each of said sections; a cross-head movable in the forward line of travel of the pallets along the trackway, to engage the pallets on the "feed-in" section to move said pallets progressively forward toward the "center" and "feed-out" sections; an apron on said cross head resting on the pallets that are moved from the "feed-in" to the "center" sections to be interposed between the pallets and mold in the "center" section, said apron being withdrawn by the cross-head from between the pallets and mold in the "center" section as it is moved rearwardly to rest on a fresh charge of pallets on the "feed-in" section; and means to release the engagement of the mold on the apron to permit said apron to be withdrawn and the molded products deposited on the pallets in the "center" section preliminarily to moving said pallets onto the "feed-out" section.

20. A machine for molding concrete units comprising, a mold open on its top and bottom sides; a pallet trackway beneath said mold divided into separate "feed-in", "center", and "feed-out" sections; a plurality of pallets arranged on each of said sections; a cross-head movable in the forward line of travel of the pallets along the trackway, to engage the pallets on the "feed-in" section to move said pallets progressively forward toward the "center" and "feed-out" sections; an apron on said cross-head resting on the pallets that are moved from the "feed-in" to the "center" sections to be interposed between the pallets and mold in the "center" section, said apron being withdrawn by the cross-head from between the pallets and mold in the "center" section as it is moved rearwardly to rest on a fresh charge of pallets on the "feed-in" section; means to engage the mold in sealed contact with the apron and the pallets in the "center" section; and means to release the engagement of the mold on the apron to permit said apron to be withdrawn and the molded products deposited on the pallets in the "center" section preliminary to moving said pallets onto the "feed-out" section.

21. A machine for molding concrete units comprising, a mold open on its top and bottom sides; hydraulically actuated mechanism for raising and lowering the mold; a pallet trackway beneath said mold divided into separate "feed-in", "center", and "feed-out" sections; a plurality of pallets arranged on each of said sections; a cross-head movable in the forward line of travel of the pallets along the trackway, to engage the pallets on the "feed-in" section to move said pallets progressively forward toward the "center" and "feed-out" sections; hydraulically actuated mechanism to move said cross-head; an apron on said cross-head resting on the pallets that are moved from the "feed-in" to the "center" sections to be interposed between the pallets and mold in the "center" section, said apron being withdrawn by the cross-head from between the pallets and mold in the "center" section as it is moved rearwardly to rest on a fresh charge of pallets on the "feed-in" section; a hopper to supply concrete to the open top of the mold; hydraulically actuated mechanism to move said hopper back and forth across the mold; means to engage the mold in sealed contact with the apron and the pallets in the "center" section; and means to release the engagement of the mold on the apron to permit said apron to be withdrawn and the molded products deposited on the pallets in the "center" section preliminarily to moving said pallets onto the "feed-out" section.

22. In a molding machine, a support adapted to have material molded thereon; a cellular mold carrier arranged in relation to and above the level of said support; cellular molds of varying heights positionable on said carrier, the bottoms of said molds having the same spaced relation to the support; and a spreader for plastic material mounted in adjustable position on the machine to pass across the upper face of molds of varying heights.

23. In a molding machine for molding moldable materials; a mold to receive moldable material through an open upper face and to discharge said material when molded thru the open bottom face thereof; a pallet to close the open bottom face of the mold; and means actuated by hydraulic pressure to elevate the mold relative to the support to effect the discharge of the molded product from the mold onto the support evenly and uniformly and in line with the force of gravity.

In testimony whereof, I have hereunto set my hand at San Francisco, California, this 2nd day of July 1929.

CHARLES C. H. THOMAS.